United States Patent
Nishimura et al.

(10) Patent No.: US 9,121,483 B2
(45) Date of Patent: Sep. 1, 2015

(54) FOUR-JOINT LINK TYPE CONTINUOUSLY VARIABLE TRANSMISSION

(75) Inventors: Yuji Nishimura, Saitama (JP); Kazuki Ichikawa, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 43 days.

(21) Appl. No.: 14/112,700

(22) PCT Filed: Mar. 15, 2012

(86) PCT No.: PCT/JP2012/056678
§ 371 (c)(1),
(2), (4) Date: Oct. 18, 2013

(87) PCT Pub. No.: WO2013/001859
PCT Pub. Date: Jan. 3, 2013

(65) Prior Publication Data
US 2014/0033841 A1    Feb. 6, 2014

(30) Foreign Application Priority Data

Jun. 30, 2011   (JP) .................... 2011-145850

(51) Int. Cl.
*F16H 29/04*  (2006.01)
*F16H 21/14*  (2006.01)

(52) U.S. Cl.
CPC ............ *F16H 21/14* (2013.01); *F16H 29/04* (2013.01); *Y10T 74/151* (2015.01); *Y10T 74/1524* (2015.01); *Y10T 74/18376* (2015.01)

(58) Field of Classification Search
CPC ......... F16H 29/04; F16H 29/06; F16H 21/14; Y10T 74/151; Y10T 74/1524
See application file for complete search history.

(56) References Cited

U.S. PATENT DOCUMENTS

| | | | |
|---|---|---|---|
| 1,181,168 A | 5/1916 | Reece | |
| 2005/0039572 A1 | 2/2005 | Friedmann | |

FOREIGN PATENT DOCUMENTS

| | | | |
|---|---|---|---|
| DE | 221328 | | 5/1962 |
| DE | 102 43 533 A1 | | 4/2003 |
| DE | 10 2009 013 996 A1 | | 10/2009 |
| DE | 10 2009 031 793 A1 | | 1/2010 |
| JP | 52-67456 A | | 6/1977 |
| JP | 2005-502543 A | | 1/2005 |
| JP | 2009-197981 A | | 9/2009 |
| JP | 2010-025324 A | | 2/2010 |
| WO | WO 03/026911 A1 | | 4/2003 |
| WO | WO 03/027538 | * | 4/2003 |
| WO | WO 2010/009697 | * | 1/2010 |
| WO | WO 2010/043193 A1 | | 4/2010 |

* cited by examiner

*Primary Examiner* — William C Joyce
(74) *Attorney, Agent, or Firm* — Squire Patton Boggs (US) LLP

(57) ABSTRACT

To suppress flexure of an input shaft of a four-joint link type continuously variable transmission. The four-joint link type variable transmission is equipped with a hollow input shaft, an output shaft, an eccentric mechanism, a swing link, a one-way rotation preventing mechanism, a connecting rod, and a pinion shaft inserted into the input shaft. The connecting rod has, at one end portion, a large-diameter annular portion externally fitted to the eccentric mechanism so as to be capable of rotating freely, and the other end coupled to a swing end portion of the swing link. To the pinion shaft, a roller bearing for pinion supporting the input shaft is provided.

3 Claims, 10 Drawing Sheets

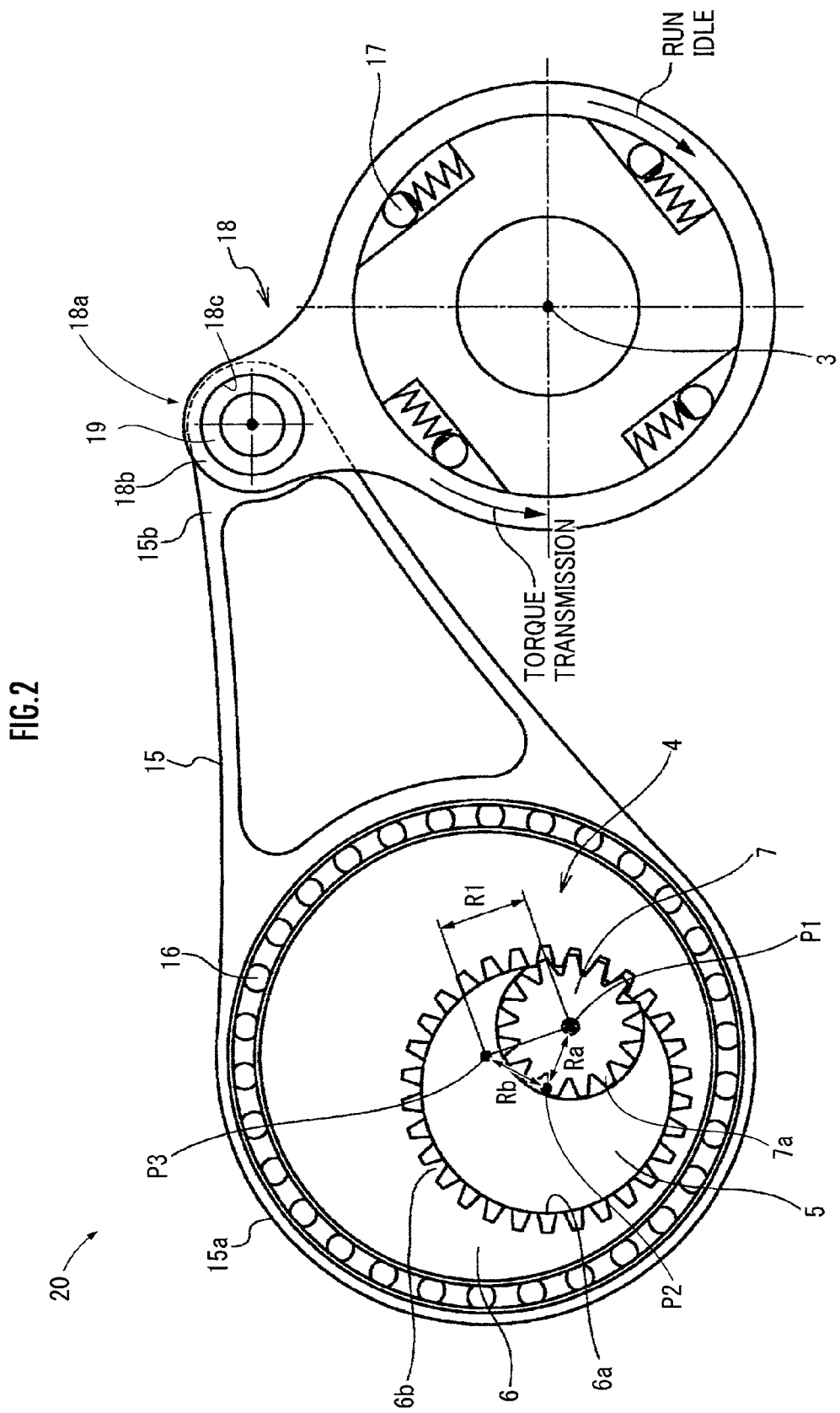

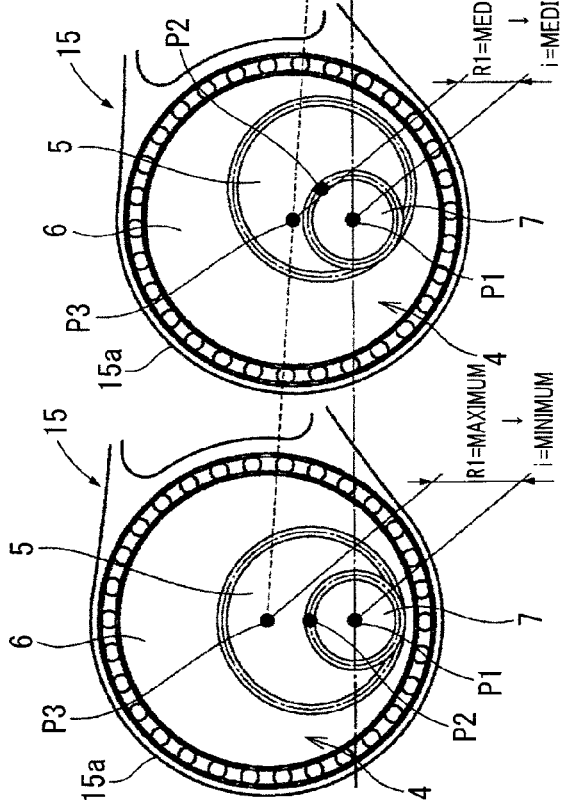

FOUR-JOINT LINK TYPE CONTINUOUSLY VARIABLE TRANSMISSION

TECHNICAL FIELD

The present invention relates to a four-joint link type continuously variable transmission capable of freely changing speed by adjusting an eccentric amount with an eccentric mechanism provided to an input shaft.

Conventionally, a four-joint type continuously variable transmission, which has a hollow input shaft transmitted with a drive power from a drive source such as an engine provided in a vehicle, an output shaft disposed in parallel to the input shaft, a plurality of eccentric mechanisms provided to the input shaft, a plurality of swing links axially supported to the output shaft so as to freely swing, and a connecting rod, with one end portion thereof including a large-diameter annular portion which is externally fitted to the eccentric mechanism so as to freely rotate, and with the other end portion being coupled to a swinging end portion of the swing link, is known (for example, refer to Japanese Patent application Laid-Open No. 2005-502543).

In the technique disclosed in Japanese Patent application Laid-Open No. 2005-502543, each eccentric mechanism is configured from a fixed disk provided eccentrically to the input shaft, and a swing disk provided eccentrically to the fixed disk and so as to be capable of rotating freely. Further, a one-way clutch is provided between the swing link and the output shaft. The one-way clutch fixes the swing link to the output shaft when the swing link relatively rotates in one direction with respect to the output shaft, and makes the swing link run idle with respect to the output shaft, when the swing shaft relatively rotates to the other side.

A pinion shaft is inserted into the input shaft. Further, a notched hole is formed to a position opposing an eccentric direction of the fixed disk. The pinion shaft is exposed from the notched hole. The swing disk is formed with a receiving hole which receives the input shaft and the fixed disk. An internal teeth is formed to an inner peripheral surface of the swing disk forming the receiving hole.

The internal teeth meshes with the pinion shaft exposed from the notched hole of the input shaft. When the input shaft and the pinion shaft are rotated at a same speed, an eccentric amount of the eccentric mechanism is maintained. When the rotating speed of the input shaft and the pinion shaft are differed, the eccentric amount of the eccentric mechanism is changed, and a transmission gear ratio changes.

By rotating the eccentric mechanism by rotating the input shaft, the large-diameter annular portion of the connecting rod makes a rotational movement, and the swing end portion of the swing link coupled to the end portion of the other end of the connecting rod swings. The swing link is provided to the output shaft via the one-way clutch. Therefore, a rotational driving force (torque) is transmitted to the output shaft, only when the swing link swings to one side.

The eccentric direction of the fixed disk of each eccentric mechanism is set so as to circle about the input shaft by changing the phase thereof respectively. Therefore, since the swing link sequentially transmits the torque to the output shaft, by the connecting rod externally fitted to each eccentric mechanism, the output shaft may be rotated smoothly.

SUMMARY OF INVENTION

Technical Problem

The input shaft of the four-joint link type (four linkage type) continuously variable transmission tends to flex since large load is added thereto from the connecting rod via the eccentric mechanism. Since the four-joint link type continuously variable transmission is for changing the transmission gear ratio by adjusting the eccentric amount of the eccentric mechanism, an adjustment accuracy of the transmission gear ratio decreases when the input shaft flexes.

In view of the above-mentioned point, the present invention aims at providing a four-joint link type continuously variable transmission capable of suppressing flexure of the input shaft.

Solution to Problem

In order to achieve the above-mentioned object, the present invention provides a four-joint link type continuously variable transmission comprising: a hollow input shaft to which a drive force from a drive source of a vehicle is transmitted; an output shaft disposed in parallel to the input shaft; a plurality of eccentric mechanisms having a fixed disk provided eccentrically to the input disk, and a swing disk provided eccentrically to the fixed disk so as to be capable of rotating freely, a plurality of swing links axially supported to the output shaft so as to be capable of swinging freely, a one-way rotation preventing mechanism provided between the swing link and the output shaft, which fixes the swing link to the output shaft when the swing link relatively rotates with respect to the output shaft in one side, and which makes the swing link run idle with respect to the output shaft when the swing link relatively rotates to the other side; a connecting rod having at one end thereof a large-diameter annular portion which is externally fitted to the eccentric mechanism so as to be capable of rotating freely, and another end coupled to a swing end portion of the swing link; and a pinion shaft inserted into the input shaft; in which the input shaft is formed at a portion opposing an eccentric direction of the fixed disk with a notched hole, and the pinion shaft is exposed from the notched hole, the swing disk is formed with a receiving hole which receives the input shaft and the fixed disk, an internal teeth is formed to an inner circumferential surface of the swing disk forming the receiving hole, the internal teeth meshes with the pinion shaft exposed from the notched hole of the input shaft, and the four-joint link type continuously variable transmission controls a transmission gear ratio by maintaining an eccentric amount of the eccentric mechanism by rotating the input shaft and the pinion shaft at an identical speed, and by changing the eccentric amount of the eccentric mechanism by changing the rotational speed of the input shaft and the pinion shaft; wherein a plurality of external teeth meshing with the internal teeth is provided to the pinion shaft with a space therebetween in the axis direction; and a bearing for pinion supporting the input shaft is provided to the pinion shaft.

According to the present invention, it becomes possible to support the input shaft from inner side thereof by the pinion shaft via the bearing for pinion. Therefore, it becomes possible to suppress the flexure of the input shaft, and to suppress a decrease of an adjustment accuracy of the transmission gear ratio of the continuously variable transmission.

In the present invention, it is preferable that the bearing for pinion is disposed so as to at least overlap a part of a bearing for eccentric mechanism provided between the fixed disk and the swing disk in a radial direction. In the four-joint link type continuously variable transmission, the load acting on the input shaft is transmitted via the bearing for eccentric mechanism.

Therefore, by disposing the bearing for pinion to overlap at least a part of the bearing for eccentric mechanism in the radial direction, it becomes possible to receive the load added to the input shaft via the bearing for eccentric mechanism, directly by the bearing for pinion. By doing so, it becomes possible to suppress the flexure of the input shaft more surely.

Further, in the present invention, it may be configured so that the input shaft rotates taking an input central axis line as a center, the input shaft and the fixed disk are configured separately, and the fixed disk is supported by the input shaft on the input central axis line.

BRIEF DESCRIPTION OF THE DRAWINGS

FIG. 2 is an explanatory view showing an eccentric mechanism, a connecting rod, a swing link of the present embodiment from an axis direction.

FIG. 3A through FIG. 3D are explanatory views explaining a change of an eccentric amount of the eccentric mechanism of the present embodiment.

FIG. 4 is an explanatory view showing a relationship between the change of the eccentric amount of the eccentric mechanism and a range of a swing movement of a swing link of the present embodiment.

DESCRIPTION OF EMBODIMENTS

Next, embodiments of a four-joint link type continuously variable transmission of the present invention will be explained. The continuously variable transmission of the present embodiment is a transmission capable of setting a transmission gear ratio i (i=rotational speed of input shaft/rotational speed of output shaft) to infinity (∞) and to set the rotational speed of the output shaft to 0, and is one type of a so-called infinity variable transmission (IVT).

Figure 1:
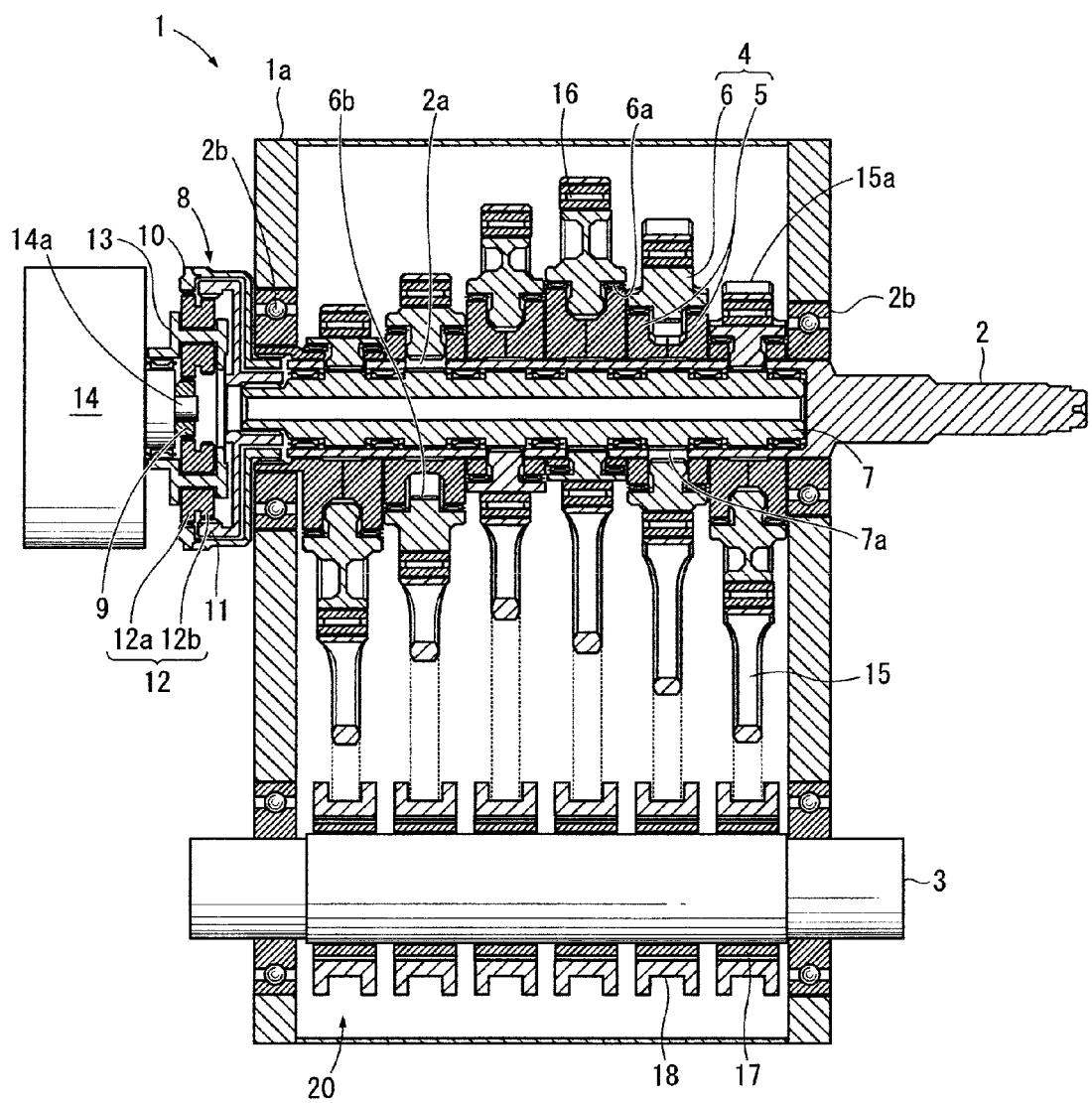
FIG. 1 is a cross-sectional view showing an embodiment of a four-joint link type continuously variable transmission of the present invention.

With reference to FIG. 1 and FIG. 2, a continuously variable transmission 1 of the present invention is equipped with a hollow input shaft 2 which rotates centering around an input central axis line P1 by receiving rotative power from a driving source for vehicle such as an engine as an internal combustion engine or an electric motor, not shown, an output shaft 3 which is disposed in parallel to the input shaft 2 and which transmits the rotative power to drive wheels (not shown) of the vehicle via a differential gear or a propeller shaft not shown, and six eccentric mechanisms 4 provided to the input shaft 2.

Each eccentric mechanism 4 is configured from a fixed disk 5 and a swing disk 6. The fixed disk 5 is disk-shaped, and is provided in a pair of two to the input shaft 2, so as to rotate integrally with the input shaft 2 eccentrically from the input central axis line P1. The pair of the fixed disks 5 of each eccentric mechanism 4 has the phase thereof being varied by 60 degrees, and the six sets of the fixed disks 5 are disposed so as to circle in a circumferential direction of the input shaft 2. Further, to each pair of the fixed disks 5, a disk-shaped swing disk 6, which is equipped with a receiving hole 6a for receiving the fixed disk 5 therein, is externally fitted eccentrically so as to be freely rotatable.

The swing disk 6 is eccentric to the fixed disk 5 so that, when a central point of the fixed disk 5 is P2 and a central point of the swing disk 6 is P3, a distance Ra between the input central axis line P1 and the central point P2, and a distance Rb between the central point P2 and the central point P3 becomes identical.

To the receiving hole 6a of the swing disk 6, an internal teeth 6b is provided so as to be positioned between the pair of the fixed disks 5. To the input shaft 2, a notched hole 2a which communicates between an inner surface and an outer surface thereof is formed, so as to be positioned between the pair of the fixed disks 5, at a portion opposing to an eccentric direction of the fixed disk 5.

The input shaft 2 is axially supported to a transmission case 1a via a bearing for input shaft 2b. The bearing for input shaft 2b is press fitted into a hole provided to the transmission case 1a. The input shaft 2 is press fitted into the bearing for input shaft 2b. The bearing for input shaft 2b or the input shaft 2 may be fitted into the transmission case 1a or the bearing for input shaft 2b with a minute space existing therebetween. However, if they are press fitted, it becomes possible to prevent rattling, and to improve adjustment accuracy of the transmission gear ratio of the continuously variable transmission 1.

To inside of the hollow input shaft 2, a pinion shaft 7 disposed concentrically to the input shaft and equipped with an external teeth 7a at a portion corresponding to the swing disk 6, is disposed so as to freely rotate relatively to the input shaft 2. The external teeth 7a of the pinion shaft 7 meshes with the internal teeth 6b of the swing disk 6, via the notched hole 2a of the input shaft 2.

The pinion shaft 7 is connected with a differential mechanism 8. The differential mechanism 8 is configured from a planetary gear mechanism, and is equipped with a sun gear 9, a first ring gear 10 coupled to the input shaft 2, a second ring gear 11 coupled to the pinion shaft 7, and a carrier 13 which axially supports a stepped pinion 12 consisting of a large-diameter portion 12a meshing with the sun gear 9 and the first ring gear 10, and a small-diameter portion 12b meshing with the second ring gear 11, so as to freely rotate and revolve.

To the sun gear 9, a rotational axis 14a of a drive source 14 consisting of an electric motor for the pinion shaft 7 is coupled. When the rotational speed of the drive source 14 is made identical to the rotational speed of the input shaft 2, the sun gear 9 and the first ring gear 10 rotates at an identical speed, four elements of the sun gear 9, the first ring gear 10, the second ring gear 11, and the carrier 13 become a locked state being incapable of rotating relatively, so that the pinion shaft 7 coupled to the second ring gear 11 rotates at the identical speed with the input shaft 2.

When the rotational speed of the drive source 14 is made slower than the rotational speed of the input shaft 2, and when a rotation frequency of the sun gear 9 is Ns, a rotation frequency of the first ring gear 10 is Nr1, and a gear ratio of the sun gear 9 and the first ring gear 10 (number of teeth of the first ring gear 10/number of teeth of the sun gear 9) is j, then a rotation frequency of the carrier 13 is (j·Nr1+Ns)/(j+1). Further, when a gear ratio of the sun gear 9 and the second ring gear 11 (number of teeth of the second ring gear 11/number of teeth of the sun gear 9)×(number of teeth of the large-diameter portion 12a/number of teeth of the small-diameter portion 12b of the stepped pinion 12) is k, the rotation frequency of the second ring gear 11 is {j(k+1)Nr1+(k−j)Ns}/{k(j+1)}.

In a case where the rotational speed of the input shaft 2 fixed with the fixed disk 5 and the rotational speed of the pinion shaft 7 are identical, the swing disk 6 rotates integrally with the fixed disk 5. In a case where there is a difference between the rotational speed of the input shaft 2 and the rotational speed of the pinion shaft 7, the swing disk 6 rotates around a peripheral edge of the fixed disk 5 taking the central point P2 of the fixed disk 5 as the center thereof.

As is shown in FIG. 2, the swing disk 6 is eccentric to the fixed disk 5 so that the distance Ra and the distance Rb becomes identical. Therefore, by rotating the input shaft 2 and the pinion shaft 7 so that the central point P3 of the swing disk 6 is positioned on the same axis line with the input central axis line P1, it becomes possible to set a distance between the input central axis line P1 and the central point P3, that is, an eccentric amount R1, to 0.

The continuously variable transmission 1 is equipped with a connecting rod 15, which includes a large-diameter annular portion 15a with a large diameter on one end portion, and a small-diameter annular portion 15b having a diameter smaller than the large-diameter annular portion 15a on the other end portion.

To a peripheral edge of the swing disk 6, the large-diameter annular portion 15a of the connecting rod 15 is externally fitted so as to freely rotate via a roller bearing 16 for connecting rod. To the output shaft 3, six swing links 18 are provided corresponding to the connecting rod 15, via a one-way clutch 17 as a one-way rotation preventing mechanism.

The swing link 18 is formed annularly, and to an upward side thereof, a swing end portion 18a coupled to the small-diameter portion 15b of the connecting rod 15 is provided. To the swing end portion 18a, a pair of protrusions 18b protruding so as to sandwich the small-diameter annular portion 15b in the axis direction is provided. To the pair of protrusions 18b, a through hole 18c corresponding to an internal diameter of the small-diameter annular portionl 5b is provided piercingly. A coupling pin 19 is inserted into the through hole 18c and the small-diameter annular portion 15b. By doing so, the connecting rod 15 and the swing link 18 are coupled.

FIG. 3 shows a positional relationship between the pinion shaft 7 and the swing disk 6, in a state where the eccentric amount R1 of the eccentric mechanism 4 is varied. FIG. 3A shows a state where the eccentric amount R1 is "maximum", and the pinion shaft 7 and the swing disk 6 are positioned so that the input central axis line P1, the central point P2 of the fixed disk 5, and the central point P3 of the swing disk 6 are aligned in a straight line. The transmission gear ratio i becomes minimum in this state.

FIG. 3B shows a state where the eccentric amount R1 is "medium" smaller than FIG. 3A, and FIG. 3C shows a state where the eccentric amount R1 is "small" further smaller than FIG. 3B. The transmission gear ratio i in FIG. 3B becomes "medium" larger than the transmission gear ratio i of FIG. 3A, and becomes "large" in FIG. 3C larger than the transmission gear ratio i in FIG. 3B. FIG. 3D shows a state where the eccentric amount R1 is 0, and the input central axis line P1 and the central point P3 of the swing disk 6 are positioned concentrically. The transmission gear ratio i becomes infinite (∞) in this state.

As is shown in FIG. 2, the eccentric mechanism 4, the connecting rod 15, and the swing link 18 of the present embodiment constitute a four-joint link mechanism 20. The continuously variable transmission 1 of the present embodiment is equipped with a total of six four-joint link mechanisms 20. In a state where the eccentric amount R1 is not 0, when the input shaft 2 is made to rotate, and also the pinion shaft 7 is made to rotate at the identical speed with the input shaft 2, each connecting rod 15 mutually repeats pushing towards the output shaft 3 side and pulling towards the input shaft 2 side between the input shaft 2 and the output shaft 3, while changing the phase by 60 degrees, and on the basis of the eccentric amount R1.

The small-diameter annular portion 15b of the connecting rod 15 is coupled to the swing link 18 that is provided to the output shaft 3 via the one-way clutch 17, so that when the swing link 18 swings by being pushed and pulled by the connecting rod 15, the output shaft 3 rotates only when the swing link 18 rotates in either one of the pushing direction or the pulling direction, and when the swing link 18 rotates in the other direction, force of the swinging movement of the swing link 18 is not transmitted to the output shaft 3, and the swing link 18 runs idle. Each eccentric mechanism 4 is disposed while changing the phase by 60 degrees each, so that the output shaft 3 is sequentially rotated by each eccentric mechanism 4.

Figure 4A:
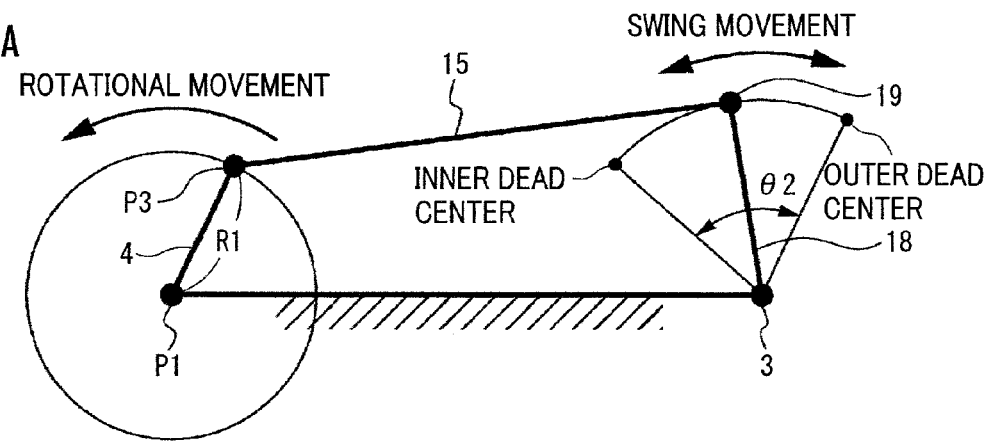
FIG. 4A shows the swing range of the swing link when the eccentric amount is maximum.
Figure 4B:
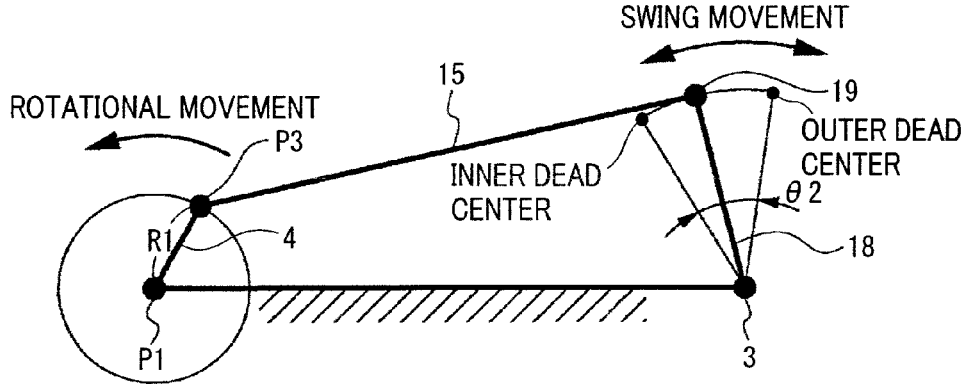
FIG. 4B shows the swing range when the eccentric amount is medium.
Figure 4C:
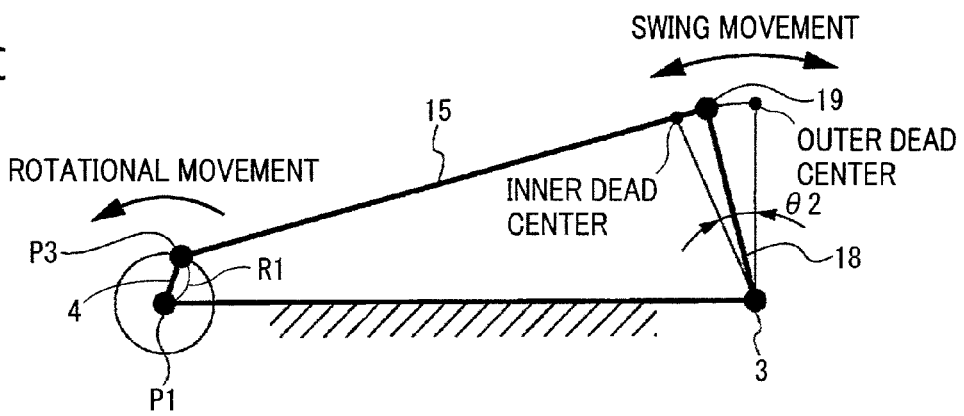
FIG. 4C shows the swing range when the eccentric amount is small.

FIG. 4A shows a case where the eccentric amount R1 is "maximum" in FIG. 3A (a case where the transmission gear ratio i is minimum), FIG. 4B shows a case where the eccentric amount R1 is "medium" in FIG. 3B (a case where the transmission gear ratio i is medium), and FIG. 4C shows a case where the eccentric amount R1 is "small" in FIG. 3C (a case where the transmission gear ratio i is large), of the swing range θ2 of the swing link 18 with respect to the rotational movement of the eccentric mechanism 4. As is apparent from FIG. 4, as the eccentric amount R1 becomes smaller, the swing range θ2 of the swing link 18 becomes narrower. When the eccentric amount R1 is 0, the swing link 18 does not swing. Further, in the present embodiment, of the swing range θ2 of the swing end portion 18a of the swing link 18, a position closest to the input shaft 2 is an inner dead center, and a position farthest from the input shaft 2 is an outer dead center.

Figure 5:
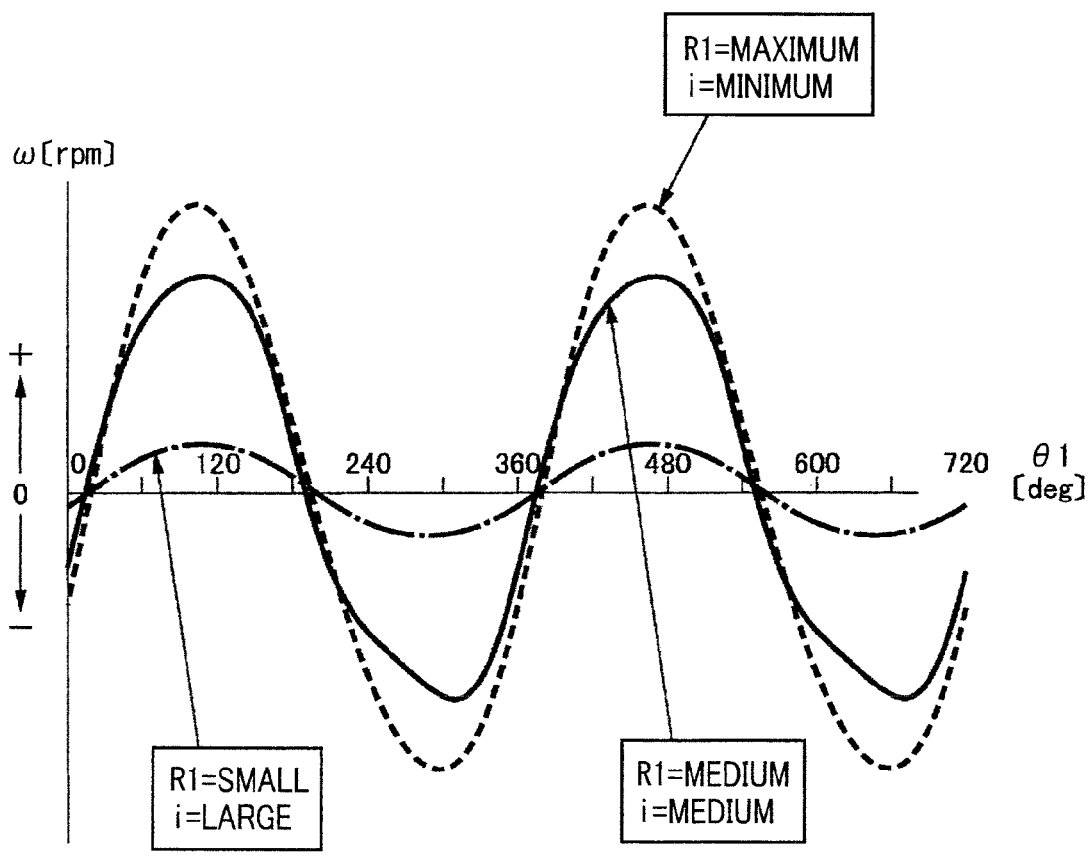
FIG. 5 is a graph showing a change of an angular velocity of the swing link, with respect to the change of the eccentric amount of the eccentric mechanism of the present embodiment.

FIG. 5 shows a relationship of change of an angular velocity ω of the swing link 18 accompanying the change of the eccentric amount R1 of the eccentric mechanism 4, taking a rotational angle θ1 of the eccentric mechanism 4 of the continuously variable transmission 1 as an axis of abscissas, and the angular velocity w of the swing link 18 as an axis of ordinate. As is apparent from FIG. 5, as the eccentric amount R1 is larger (the transmission gear ratio i is smaller), the angular velocity ω of the swing link 18 becomes larger.

Figure 6:
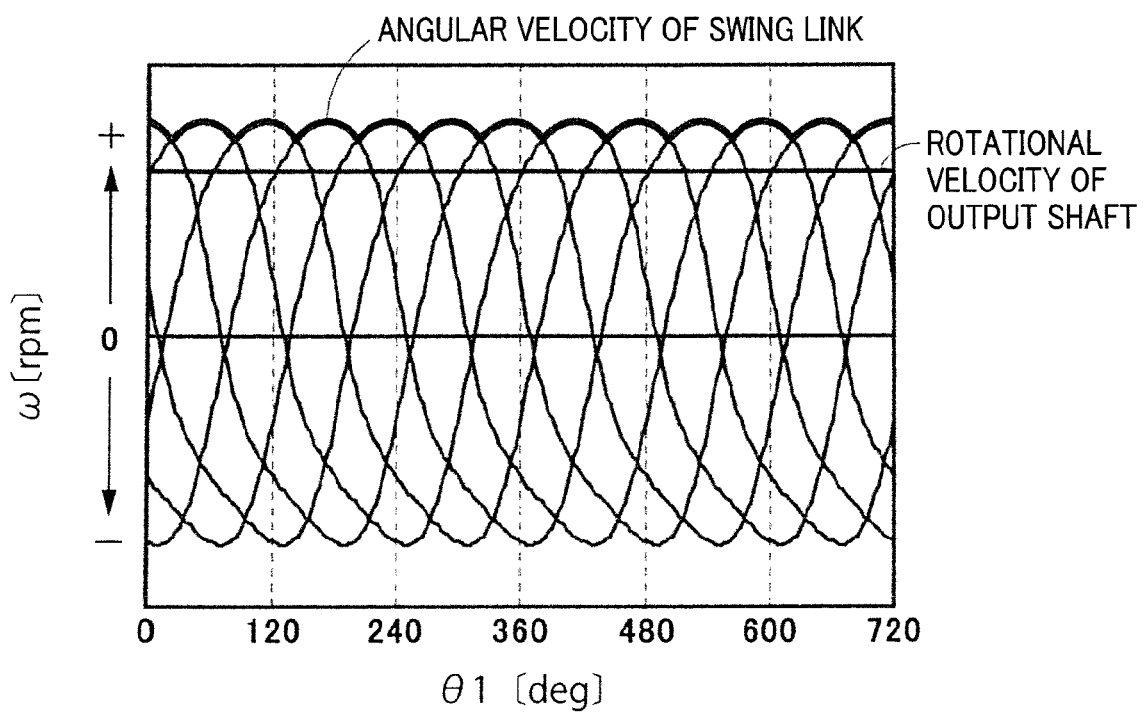
FIG. 6 is a graph showing a state where an output shaft is rotated by six four-joint link mechanism with phases thereof being differed by 60 degrees, in the continuously variable transmission of the present embodiment.

FIG. 6 shows the angular velocity ω of each swing link 18, with respect to the rotational angle θ1 of the eccentric mechanism 4, when six eccentric mechanisms 4 with the phase changed by 60 degrees each are rotated (when the input shaft 2 and the pinion shaft 7 are rotated at the identical speed). From FIG. 6, it could be understood that the output shaft 3 is smoothly rotated by the six four-joint link mechanisms 20.

Figure 7:
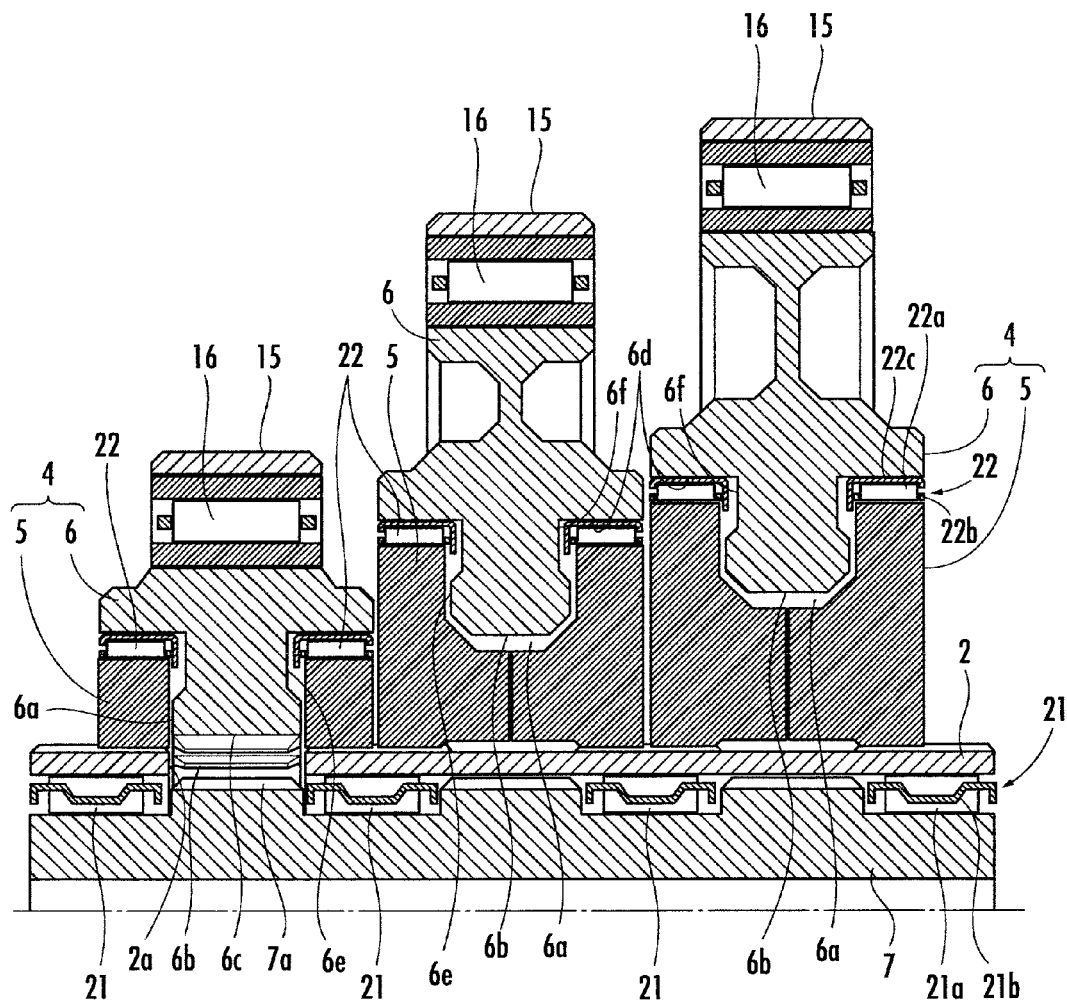
FIG. 7 is a cross-sectional view showing a bearing for pinion of the present embodiment.
Figure 8:
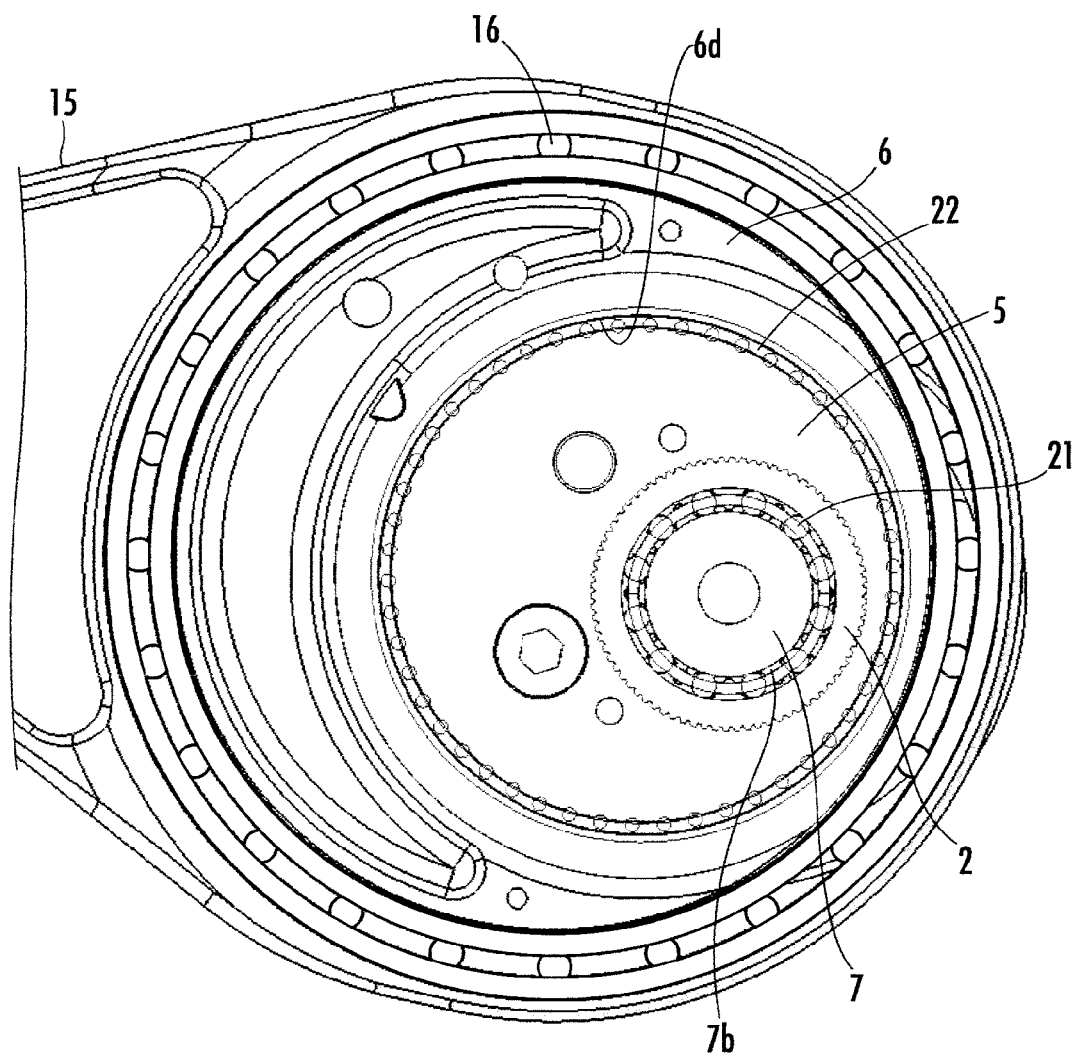
FIG. 8 is an explanatory view showing a vicinity of the input shaft of the continuously variable transmission of the present embodiment from an axis direction.
Figure 9:
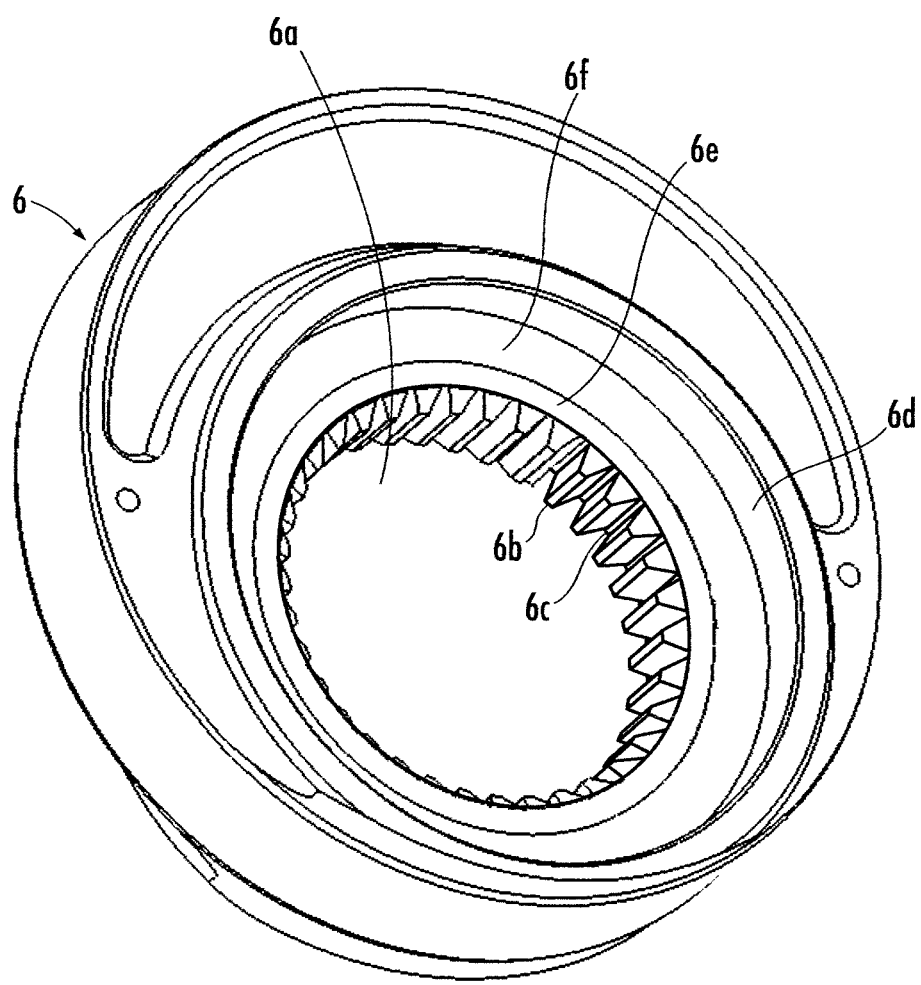
FIG. 9 is a perspective view showing an eccentric disk of the present embodiment.

With reference to FIG. 7 through FIG. 9, the receiving hole 6a of the swing disk 6 is configured from a small-diameter hole 6c of a small diameter positioned at a center in the axis direction, and a pair of large-diameter holes 6d with a larger diameter than the small-diameter hole 6c disposed so as to sandwich the small-diameter hole 6c from the axis direction. A stepped portion 6e is formed between the small-diameter hole 6c and the large-diameter hole 6d, from the difference in the diameter between the two. On the large-diameter hole 6d side of the stepped portion 6e, a notched portion 6f which is cutout in the axis direction is formed. The internal teeth 6b is provided to an inner peripheral surface of the small-diameter hole 6c.

Figure 10:
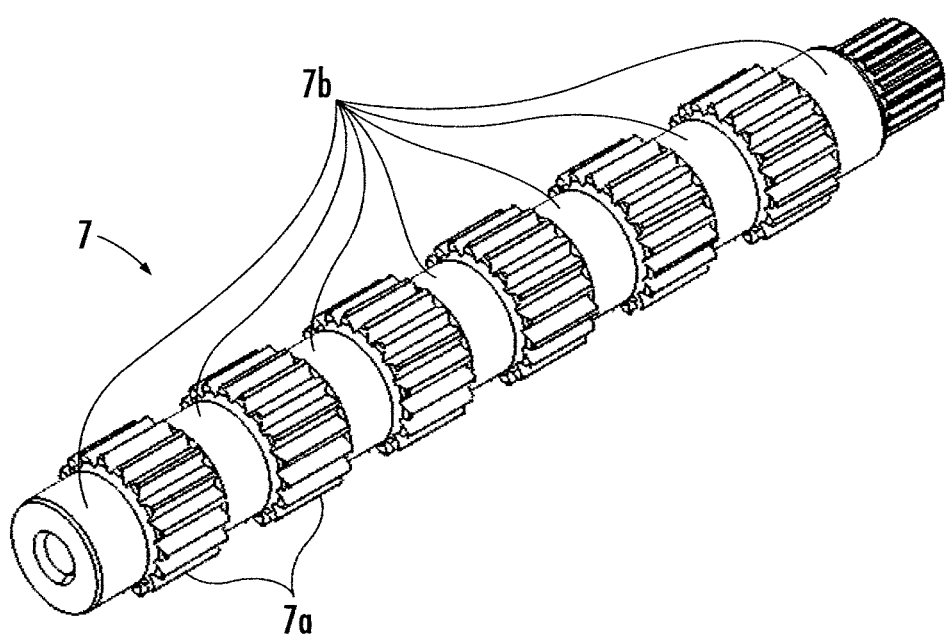
FIG. 10 is a perspective view showing a pinion shaft of the present embodiment.

As is shown in FIG. 10, the external teeth 7a is formed to the pinion shaft 7 with an interval in the axis direction. Further, to the pinion shaft 7, a mller bearing for pinion 21 for supporting the input shaft 2 from inside is formed where the external teeth 7a is formed and at a position between the external teeth 7a and the external teeth 7a in the axis direction. The roller bearing 21 is configured from a plurality of rolling elements 21a consisting of columnar "roller", and a retainer 21b which retains a plurality of the rolling elements 21a with intervals between one another. A flat surface between the external teeth 7a of the pinion shaft 7 becomes an orbit plane 7b on which the rolling element 21a of the roller bearing 21 rolls.

Returning to FIG. 7 and FIG. 8, a roller bearing for eccentric mechanism 22 is provided between an outer peripheral surface of the fixed disk 5 and the large-diameter hole 6d of the swing disk 6. As is shown in FIG. 7, the roller bearing for eccentric mechanism 22 is configured from a plurality of rolling elements 22a consisting of columnar "roller", a retainer 22b which retains a plurality of the rolling elements 22a with intervals therebetween, and an outer ring 22c. The outer ring 22c is fitted to the large-diameter hole 6d. It is not necessary to provide the outer ring 22c, and in such case, an inner peripheral surface of the large-diameter hole 6d may be an orbit plane on which the rolling element 22a rolls. The roller bearing for pinion 21 is disposed so as to overlap the roller bearing for eccentric mechanism 22 in a radial direction.

According to the four-joint link type continuously variable transmission 1 of the present embodiment, the input shaft 2 may be supported by the pinion shaft 7 from the inner side via the roller bearing for pinion 21. Therefore, compared to a case where the input shaft 2 is not supported by the pinion shaft 7, flexure of the input shaft 2 may be suppressed, so that a decrease in the adjustment accuracy of the transmission gear ratio of the continuously variable transmission 1 may be suppressed.

Further, in the four-joint link type continuously variable transmission 1, a load from the connecting rod and the swing disk acting on the input shaft 2 is transmitted via the roller bearing for eccentric mechanism 22. Therefore, by disposing the roller bearing for pinion 21 so as to overlap the roller bearing for eccentric mechanism 22 in the radial direction, the load added to the input shaft 2 via the mller bearing for eccentric mechanism 22 may be directly received by the roller bearing for pinion 21. By doing so, it becomes possible to surely suppress the flexure of the input shaft 2.

Further, according to the continuously variable transmission 1 of the present embodiment, it becomes possible to suppress the flexure of the input shaft 2, so that a clearance between the input shaft 2 and the pinion shaft 7 may be made smaller than in the conventional technique, so that it becomes possible to downsize the radial direction size of the continuously variable transmission 1.

In the present embodiment, the mller bearing for pinion 21 is configured so as to completely overlap the mller bearing for eccentric mechanism 22 in the radial direction. However, it is not limited thereto. For example, the roller bearing for pinion 21 and the mller bearing for eccentric mechanism 22 should overlap at least partly in the radial direction, and the effect of the present invention of surely preventing the flexure of the input shaft 2 may also be exerted in this case.

Further, in the present embodiment, the one-way clutch 17 is used as the one-way rotation preventing mechanism. However, the one-way rotation preventing mechanism is not limited thereto, and it may be configured from a two-way clutch configured to be able to freely switch a rotating direction of the swing link 18 with respect to the output shaft 3 in which the swing link 18 is capable of transmitting torque to the output shaft 3.

REFERENCE SIGNS LIST

1 . . . Continuously variable transmission, 2 . . . input shaft, 2a . . . notched hole, 3 . . . output shaft, 4 . . . eccentric mechanism, 5 . . . fixed disk, 6 . . . swing disk, 6a . . . receiving hole, 6b . . . internal teeth, 7 . . . pinion shaft, 7a . . . external teeth, 15 . . . connecting rod, 15a . . . large-diameter annular portion, 17 . . . one-way clutch (one-way rotation preventing mechanism), 18 . . . swing link, 18a . . . swing end portion, 21 . . . roller bearing for pinion, 22 . . . roller bearing for eccentric mechanism.

The invention claimed is:

1. A four-joint link continuously variable transmission comprising:
   a hollow input shaft to which a drive force from a drive source of a vehicle is transmitted;
   an output shaft disposed in parallel to the input shaft;
   a plurality of eccentric mechanisms having a fixed disk provided eccentrically to the input shaft, and a swing disk provided eccentrically to the fixed disk so as to be capable of rotating freely;
   a plurality of swing links axially supported to the output shaft so as to be capable of swinging freely;
   a one-way rotation preventing mechanism provided between the swing link and the output shaft, which fixes the swing link to the output shaft when the swing link relatively rotates with respect to the output shaft in one side, and which makes the swing link run idle with respect to the output shaft when the swing link relatively rotates to the other side;
   a connecting rod having at one end thereof a large-diameter annular portion which is externally fitted to the eccentric mechanism so as to be capable of rotating freely, and another end coupled to a swing end portion of the swing link; and
   a pinion shaft inserted into the input shaft;
   in which the input shaft is formed at a portion opposing an eccentric direction of the fixed disk with a notched hole, and the pinion shaft is exposed from the notched hole,
   the swing disk is formed with a receiving hole which receives the input shaft and the fixed disk,
   internal teeth is formed to an inner circumferential surface of the swing disk forming the receiving hole,
   the internal teeth meshes with the pinion shaft exposed from the notched hole of the input shaft, and
   the four-joint link type continuously variable transmission controls a transmission gear ratio by maintaining an eccentric amount of the eccentric mechanism by rotating the input shaft and the pinion shaft at an identical speed, and by changing the eccentric amount of the eccentric mechanism by changing the rotational speed of the input shaft and the pinion shaft;
   wherein a plurality of external teeth meshing with the internal teeth are provided to the pinion shaft with a space therebetween in the axis direction; and a first bearing for supporting the input shaft is provided to the pinion shaft, wherein the first bearing is disposed so as to at least overlap a part of a second bearing for the eccentric mechanism provided between the fixed disk and the swing disk in a radial direction.

2. The four-joint link continuously variable transmission according to claim 1, wherein the input shaft rotates taking an input central axis line as a center, the input shaft and the fixed disk are configured separately, and the fixed disk is supported by the input shaft on the input central axis line.

3. The four-joint link continuously variable transmission according to Claim 1, wherein the input shaft rotates taking an input central axis line as a center, the input shaft and the fixed disk are configured separately, and the fixed disk is supported by the input shaft on the input central axis line.

* * * * *